United States Patent [19]
Larsen et al.

[11] Patent Number: 5,215,797
[45] Date of Patent: Jun. 1, 1993

[54] DEADFOLD RECLOSURE STICKER

[75] Inventors: Brian D. Larsen; Lloyd Tinklenberg, both of Worthington, Minn.

[73] Assignee: Bedford Industries, Inc., Worthington, Minn.

[21] Appl. No.: 789,980

[22] Filed: Nov. 12, 1991

[51] Int. Cl.[5] ............................................. A61F 13/02
[52] U.S. Cl. ....................................... 428/40; 428/213; 428/215; 428/220; 428/343; 383/62; 383/89; 383/90; 383/905
[58] Field of Search ................. 428/40, 343, 220, 213, 428/215, 138; 383/89, 905, 62, 90, 88, 83; 53/416, 422; 493/214, 215

[56] References Cited

U.S. PATENT DOCUMENTS

| | | | |
|---|---|---|---|
| 331,357 | 12/1885 | Wineberger | 383/89 |
| 907,492 | 12/1908 | Graser | 383/89 |
| 1,903,839 | 4/1933 | Royal | 383/89 |
| 3,130,984 | 4/1964 | Fenberg | 70/150 |
| 3,354,019 | 11/1967 | Davies | 156/519 |
| 3,457,137 | 7/1969 | McCarthy | 428/172 |
| 3,537,636 | 11/1970 | Rochette | 383/89 |
| 3,869,328 | 3/1975 | Instance | 156/285 |
| 3,973,294 | 8/1976 | Pfizenmaier | 383/905 |
| 4,246,058 | 1/1981 | Reed | 156/183 |
| 4,255,220 | 3/1981 | Kucheck et al. | 156/285 |
| 4,267,768 | 5/1981 | Cieslak et al. | 493/203 |
| 4,285,999 | 8/1981 | Olivieri | 428/202 |
| 4,314,869 | 2/1982 | Crankshaw | 156/215 |
| 4,411,644 | 10/1983 | Tinklenberg | 428/43 |
| 4,420,355 | 12/1983 | Saur | 156/250 |
| 4,488,922 | 12/1984 | Instance | 156/192 |
| 4,863,772 | 9/1989 | Cross | 428/40 |

FOREIGN PATENT DOCUMENTS 401812  5/1966  Switzerland ........................ 383/905

Primary Examiner—Ellis P. Robinson
Assistant Examiner—Nasser Ahmad
Attorney, Agent, or Firm—Robert C. Baker

[57] ABSTRACT

The deadfold reclosure sticker for hand pressure application to a bag has a flexible backing liner with a low adhesion surface. On the liner is a flexible deadfold reclosure sticker having a pressure-sensitive adhesive layer forming a base surface releasably adhered to the low adhesion surface of the liner. The sticker comprises a laminate of pliable layers and at least two deadfold wires having a thickness at least twice as great as the laminate. The wires are in spaced parallel alignment and are embedded along their length in the laminate with the ends of said wires exposed to view. The flexible backing liner has a structural feature for easy removal of it for hand application of it onto a flexible bag to form a deadfold reclosable bag easily reclosed by simple folding steps.

8 Claims, 2 Drawing Sheets

DEADFOLD RECLOSURE STICKER

BACKGROUND OF THE INVENTION

This invention relates to a new article of commerce in the form of a deadfold reclosure sticker releasably adhered to a protective liner which is readily removable to permit a discrete sticker to be pressure-affixed by an individual consumer onto the surface of a foldable bag. The invention is also directed to a new reclosure folding technique for improving the mouth-foldable deadfold reclosure of opened flexible bags.

Mouth-foldable deadfold reclosures to protect residual or unused bag contents can be formed by making a simple roll or fold of a flattened bag mouth over itself. The deadfold feature is part of the bag wall.

The desirability of incorporating mouth-foldable deadfold reclosure features into the structure of a flexible bag has been recognized for ages, even for over a century as, for example, illustrated by U.S. Pat. No. 331,357 of Dec. 1, 1885.

Insofar as is known, however, no one has heretofore provided the art with a deadfold sticker useful by individual consumers to convert selected bags of goods into bags that are easily reclosed by mouth deadfolding after being opened.

SUMMARY OF THE INVENTION

The invention provides a pressure-attachable deadfold reclosure sticker releasably adhered to a removable protective liner. The sticker comprises a laminate of layers including a pressure-sensitive adhesive layer in contact with the removable protective liner. The laminate of layers is exceedingly thin, and the sticker has at least two deadfold wires in spaced parallel alignment permanently embedded in the laminate. The thickness of the wires is at least twice as great as the total thickness of all of the layers making up the laminate. Generally, or preferably, the total thickness of the layers making up the laminate (apart from the wires) will not exceed about 7 mils or about 0.007 inches. Wires in the laminate usually will have a thickness, in terms of diameter, of at least about 17 mils (27 gauge) and generally of at least about 21 mils and even as high as 35 mils (20 gauge) or even up to 50 mils. The entire laminate of deadfold sticker material is flexible and easily removed from the liner on which it is releasably adhered, so that the entire sticker may be affixed in a pressure manner on any of a number of flexible bag surfaces at the will of an individual consumer. The liner is equipped with a structural feature for easy removal of it. A preferred structural feature is a slit in the liner to facilitate easy removal of it by a simple bending step to separate the liner at the slit into two parts for easy hand gripping to evect removal. Alternatively, instead of a slit, the liner may project or extend beyond one or more edges of the sticker to facilitate easy removal of it by hand gripping.

The special new reclosure folding of bags according to the invention is such that two fold-over steps effectively create three deadfold sticker creases, thereby giving an improved reclosure for preservation of bag contents.

Other benefits and advantages of the invention will be evident as this description proceeds.

DESCRIPTION OF THE PREFERRED EMBODIMENT

Figure 1:
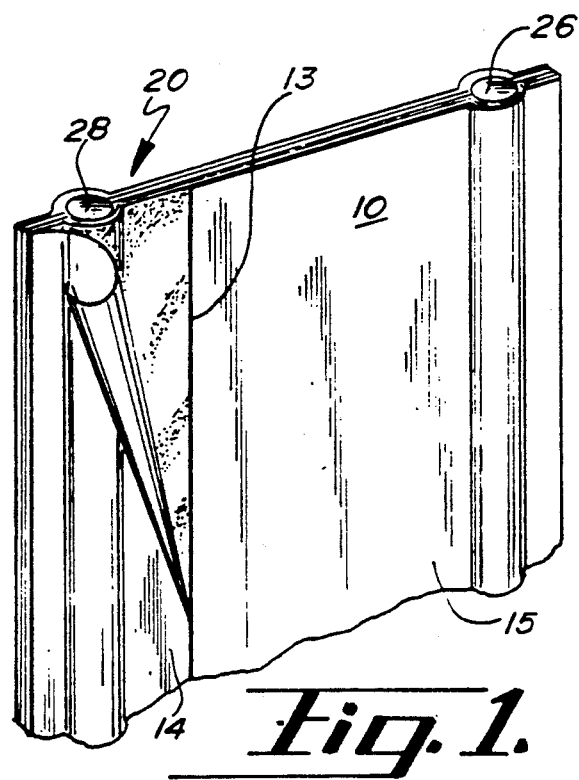
FIG. 1 is a schematic perspective rear view of a new article of this invention, with parts broken away, and particularly illustrates the slit protective liner over the pressure-sensitive adhesive layer of the article.
Figure 2:
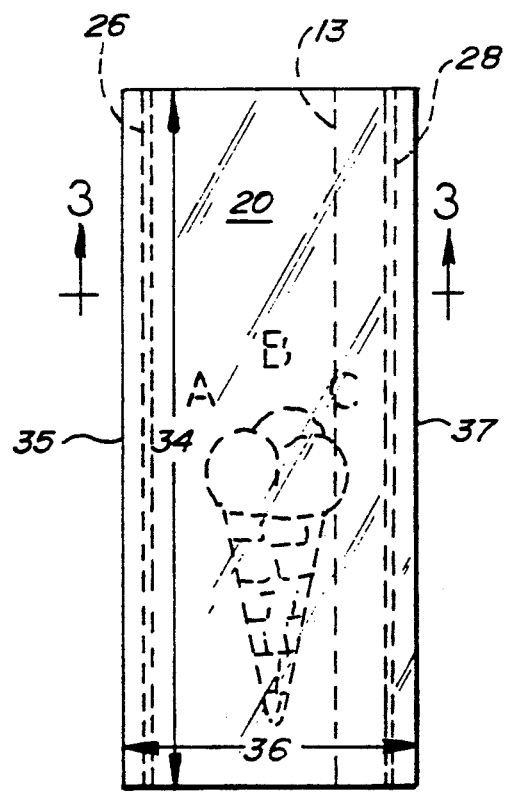
FIG. 2 is a schematic top or front plan view of the new article.
Figure 3:
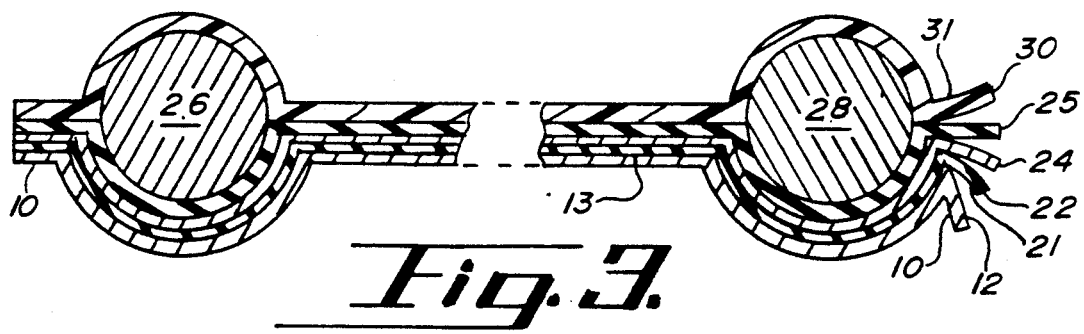
FIG. 3 is a schematic cross section taken on line 3—3 of FIG. 2, with some parts broken away, and with layers peeled apart at the right for visual clarity.

Referring to FIGS. 1, 2, and 3, the new article of the invention has a flexible protective liner 10 which is provided with a low-adhesion surface 12. Amongst the most economical of liners is paper; and a paper coated with a silicone low-adhesion coating is preferred. It is, however, within the ambit of the invention to employ other flexible protective liners, including polymeric films such as polyester films. A variety of flexible protective liners with low-adhesion surfaces, either as presently commercially available or as may be developed as technology advances, can be useful in the practice of the invention.

The liner 10 is provided with a weakness slit 13, which is opened by mere bending of the sticker 20. The two parts of the liner 14 and 15 are easily removed by hand after the slit 13 is opened by bending the sticker structure. Slit 13 is not only parallel with the pair of deadfold wires 26 and 28 but is also between them in the structure of the sticker.

The deadfold stickers 20 are carried on the liner 10 in releasably adhered condition. The sticker articles have lateral edges 35 and 37 (see FIG. 2) which define the width of them. The first dimension 34 of the stickers is parallel to the deadfold wires 26 and 28. The second dimension 36 is perpendicular to the deadfold wires 26 and 28 and is a dimension of width. The first dimension 34 is shown in FIG. 2 as being greater than the second or width dimension 36. Illustratively, the first dimension 34 (parallel with deadfold wires 26 and 28) may vary from a low of about 3 or 4 cm up to as much as 40 or 50 cm, with lengths of about 5 cm to 25 cm probably the most common. The second dimension 36 (or width of a sticker) generally will fall within about 2 cm to 30 cm, with widths between about 3 cm and 20 cm being the most popular. Most stickers of this invention will have a greater length 34 than width 36, although in some rare instances stickers for some relatively wide mouthed bags may be greater in the second dimension 36 than the first dimension 34. For the most part, stickers of the invention are substantially rectangular if not truly rectangular. Of course, the corners of a rectangular sticker may be somewhat rounded if desired.

Optionally, many more deadfold wires than the two marked as 26 and 28 may be employed in a deadfold sticker according to the invention. To be observed is that the deadfold wires terminate and are exposed at the ends of the stickers. On the other hand, the wires in their length direction are not exposed along lateral sides or edges 35 and 37 of the stickers. The wires in their length direction, while preferably near edges of a sticker, are most preferably not at the extreme edge of a sticker. They are spaced from the edges and are fully embedded along their length within the laminate of layers so a to be inseparable therefrom.

The deadfold stickers 20 have a base surface 21 which forms the interface or surface next to the low-adhesion surface of the carrier 10. Each deadfold sticker 20 comprises a laminate of pliable layers identified as 22, 24, 25, and 30 (see FIG. 3), plus at least two basic deadfold wires 26 and 28. The important point is that the deadfold wires are embedded in spaced parallel alignment in the laminate.

Each reclosure sticker has an outer layer structure 30 having an exposed face 31, and an inner layer structure 24 situated between the outer layer structure and the protective liner 10. A bonding layer 25 permanently unites the outer layer structure 30 to the inner layer structure 24, and secures the deadfold wires in embedded condition within the laminate. An adhesive layer 22 is united to the inner layer structure and forms the base surface 21 of the deadfold sticker.

The deadfold wires 26 and 28 are at least twice as great in thickness as the total thickness of all of the other layers of the laminate forming the discrete sticker. (This excludes the protective liner thickness; it is not part of the discrete sticker.) In short, the most preferred deadfold stickers of the invention are those having the thinnest possible thickness for their laminate of pliable layers, with deadfold wires embedded in such laminates and having a thickness at least twice as great and frequently three or four times as great as the total thickness of all other layers of the deadfold stickers.

The outer layer structure 30 may vary in thickness from about 0.5 mil to about 5.0 mil (0.0005 to 0.005 in.; about 12 microns up to about 130 microns). It may consist of a simple, single polymeric film, suitably of polyethylene teraphthalate or polypropylene. It may comprise a multiplicity of layers which together form the outer layer structure 30 of the stickers. In this connection, reference is made to FIGS. 4 through 7 inclusive, each of which illustrates multiple layers or films which may be employed as the outer layer structure 30.

Figure 4:
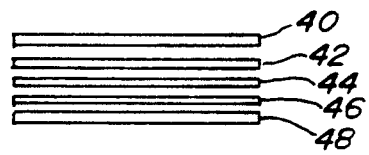
FIGS. 4 to 7, inclusive, are schematic cross sections of illustrative variations for the upper or outer layer structure of deadfold reclosure stickers of the invention.

In FIG. 4, the outermost layer is a clear film 40 (such as one of polyethylene teraphthalate, polypropylene, or other polymeric material) having a back reverse print or backprint 42 on its back or interior side. The backprint 42 may comprise any suitable inking or printing material, and may be a continuous or discontinuous layer of print of selected colors. A metallized layer 46 (e.g., a vapor deposit of metal) is applied upon a clear or opaque polymeric film 48. Then the metallized film 48 and the backprinted film 40 are adhesively united together by a thin layer of any suitable bonding adhesive 44.

Figure 5:
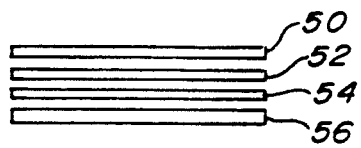

In FIG. 5, a clear polymeric film such as polyethylene teraphthalate is provided with a metallized layer deposit 56 on one side and a print of any suitable design 52 on the other. Over the print is then applied a varnish coat or clear overcoat of any suitable nature for the protection of the print layer 52.

Figure 6:
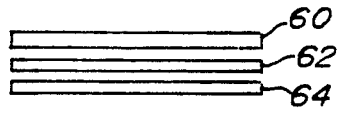

FIG. 6 illustrates a basic layer of paper 64 on which a print design 62 is applied and then a varnish layer 60 as an overcoat for protection of the print layer 62.

Figure 7:
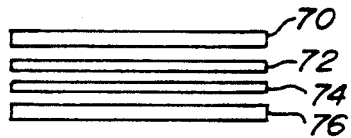

FIG. 7 is intended to illustrate use of a holographic layer 75 having a rear metallized layer 76 and a front print design 72, with an overcoat of varnish 74 for the protection of the print layer 72.

An almost infinite variety of layers, continuous and discontinuous, may be employed in the make-up of the outer layer structure 30 of the deadfold stickers. Those of FIGS. 4-7 are but illustrative. Advertising material may be incorporated in the outer layer structure 30, as for example illustrated by an ice cream cone 33 as well as the letters "ABC" in FIG. 2. Entirely clear or transparent outer layer structures may be employed. Decorative holographic designs may be used. A paper outer layer structure, unmarked and having an outer surface 31 receptive to marking as by ink or pencil, may be employed. The most preferred outer layer structures either consist of or have a layer of polymeric film or a layer of paper.

The lower or inner layer structure 24 is almost always formed of a single layer of either polymeric film or paper. However, it too may be formed of multiple layers. Generally, however, the inner layer structure will never exceed about 3 mils thickness and frequently will be as thin as about 0.5 mils, especially when the inner layer is or includes a polymeric film such as a polyester film or a polypropylene film. A 48 gauge Mylar polyester film is about 0.5 mil in thickness or about 25 microns in thickness, and is one of the more ideal thin inner layer structures to employ. However, 25-lb. per ream paper is about 2 mils or 50 microns thick, costs about half that of the 48 gauge Mylar polyester film, and in some applications is quite suitable to employ as either the outer or inner layer structure or both. Most ideally, both the outer layer structure and inner layer structure are formed using a polymeric film, especially biaxially oriented films since they generally exhibit good tensile strength. In this connection, the outer layer structure most preferably will exhibit a tensile strength in the direction transverse to (i.e., across) deadfold wires 26 and 28 at some level on the order of about 15,000 psi or more, with a yield value exceeding about half that figure of tensile strength. The tear and tensile strength for the outer layer structure should be sufficient to resist puncture of the outer structure by the large deadfold wires 26 and 28 in the laminate.

The bonding layer 25, as illustrated in FIG. 3, is such that it permanently holds the outer layer structure 30 and the inner layer structure 24 together, with the deadfold wires 26 and 28 fixed between them. Any suitable bonding material may be employed, with attention given to its properties for securely uniting the particular surfaces of the outer 30 and inner 24 layer structures. In this respect, polymeric film surfaces may be enhanced for their receptivity to bonding by corona treatment or any other of a variety of treatments currently available or developed as technology advances. A variety of bonding adhesives may be employed and polyurethane hot melt adhesives, especially those which are moisture curable, are but one example of adhesives desirable for uniting polyester films. For the most part, hot melt adhesives are preferred over solvent based ones for reasons based on avoidance of pollution problems. Hot melt adhesive formulations based on ethylene vinyl acetate are useful in the practice of the invention, especially where the adhesive bonding layer 25 is in contact with paper surfaces for the outer layer structure 30 and the inner layer structure 24. Still other bonding adhesives may be employed so long as the selection of the adhesive is based upon its properties for uniting particular surface materials contained on the surface of the outer and inner layers to be united. Pressure-sensitive adhesives may be employed but are not preferred because they too frequently allow some shift or flow of their material and thus may allow undesired shift or movement of the embedded deadfold wires. An important characteristic of the bonding layer is that it is flexible and does not crack on bending or folding. Elastomeric-type bonding adhesives which set up or cure or cool to a non-tacky condition are preferred, of which the polyurethanes as well as the ethylene vinyl acetates are exemplary.

The bonding layer is maintained as thin as possible but thick enough to permanently adhere the outer and inner layers of the laminate. The thickness generally will fall within the range of 0.5 to 2 mils, with the outer limits of thickness for the bonding layer at approximately 0.2 to 5 mils (about 2 or 3 microns up to about 125 or 130 microns).

Deadfold wires 26 and 28 for the deadfold stickers of this invention will rarely be as small as 27 gauge or 0.0175 in. in diameter. Preferably they will be at least as large as 25 gauge and even as large as 21 gauge or 20 gauge—20 gauge being about 0.0348 in. in diameter. Ductile wires of various metals or other materials may be employed as deadfold wires in the practice of the invention, with ductile wires of tin, iron, or aluminum the most preferred. The deadfold wires are frequently round in cross section, but other wire cross sections such as squares or rectangles may be employed.

Pressure-sensitive adhesives for layer 22 are commonly known as rubber-resin type adhesives. Depending on the specific adhesive formulation, they may be applied as a hot melt, a water dispersion, or a solvent dispersed or dissolved system. They have a balance of adhesion, cohesion, stretchiness, and elasticity which makes them aggressively and stably tacky at normal room temperature conditions, and indeed even at relatively low and also high temperature conditions. While known as rubber-resin type adhesives, it is important to recognize that the balance of properties exhibited by rubber-resin combinations can also arise and be exhibited by single polymeric materials or co-polymers, particularly those having an acrylate base. Suitable thicknesses for pressure-sensitive adhesive layer 20 will vary but generally will be at least about 2 or 3 microns and most often at least about 20 microns or even at least about 25 microns but rarely will be thicker than 3 mil or about 75 microns.

Importantly, the several layers making up the laminate as illustrated in FIG. 3 are maintained as thin as possible in the stickers made according to the invention, with the deadfold wires of the stickers dominating in size. Thus, the deadfold stickers having a thickness for the laminate of layers apart from the adhesive layer 22 not in excess of about 7 mils, and even a total thickness for all of the laminate layers including the adhesive not in excess of about 7 mils, in combination with deadfold wires at least twice as thick in diameter or breadth (in all directions transverse to the length of the wire) give exceedingly strong deadfold performance for the practice of the invention with high integrity for the sticker as a discrete article not easily pulled apart. In fact, attempts to separate layers of the sticker or separate deadfold wires from a sticker made according to the invention as most ideally practiced are destined for failure inasmuch as total mutilation of the sticker is required to accomplish such separation.

Manufacture of the stickers of the invention is suitably accomplished using known techniques such as those for manufacturing labels, except that deadfold wires are added and the layers pressed together to form the external contours of product as illustrated in FIG. 3.

In some applications as where designs or advertising or decorative material on an underlying bag surface are to show through the sticker, it is important to select the materials for the several layers of the sticker so as to provide for that transparency for the total laminate. Most frequently, however, stickers of the invention will contain layers of opaque material and will have separate markings or advertising material or the like on them.

Figures 8, 9, 10:
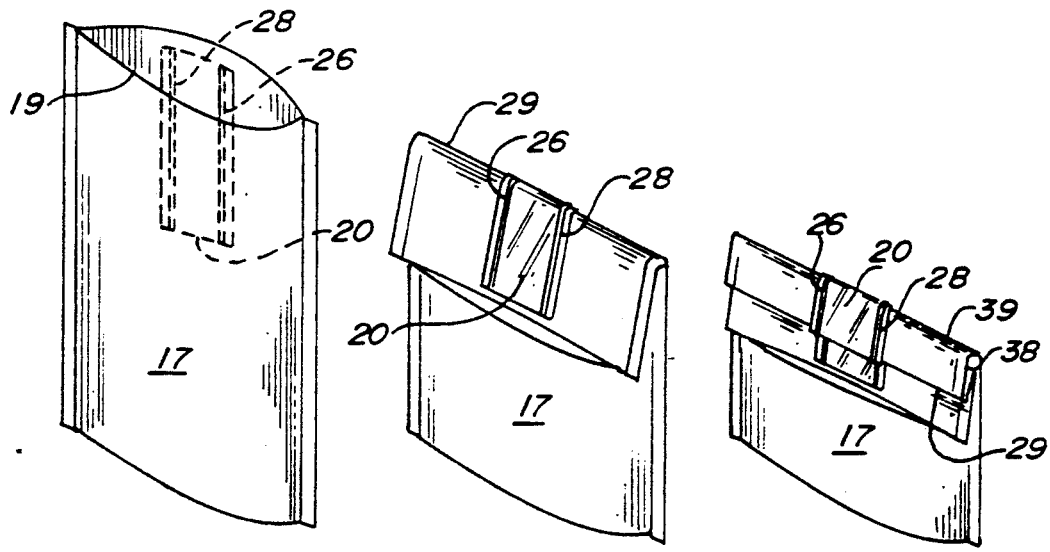
FIGS. 8, 9, and 10 are schematic perspective views of a flexible bag equipped with a deadfold reclosure sticker of the invention fixed to one side of the bag; these views illustrate the steps or stages of the fold-over-fold technique for forming preferred reclosures using stickers of the invention.

The application of the deadfold sticker 20 on the outer surface of a bag using the procedure of FIG. 1 is such that the deadfold wires 26 and 28 of the sticker extend perpendicularly to the mouth end 19 of the bag, as illustrated in FIG. 8. Thus, when the bag 17 in areas of its walls near its mouth 19 is collapsed upon itself—that is, flattened—the act of folding the mouth end upon itself effectively bends the walls of the mouth end as well as deadfold wires 26 and 28; and those wires maintain a closed condition (and folded condition) for the bag.

A closed condition at the mouth of the bag is formed simply by folding a flattened bag mouth over itself as schematically illustrated in FIG. 9. This in essence is a step of forming a first fold in the flattened walls of the mouth end of the bag. This is but the first fold or crease 29; the crease is parallel to the mouth of the bag, and the fold is effective also to fold the affixed sticker and its deadfold wires into a double thickness. This first fold alone is suitable to effect mouth closure, but not a particularly effective closure. More is required to form the most preferred deadfold reclosure.

Following the first fold which gives a crease 29 as schematically illustrated in FIG. 9, the portion of the bag having the dual thickness (i.e., double thickness of sticker and folded bag walls formed as a result of the first fold in FIG. 9) is folded upon itself, to form the structure illustrated in FIG. 10. This second fold effectively puts two more folds or creases 38 and 39 into the mouth end of the bag, but with the result that the deadfold sticker of the mouth end of the bag effectively ends up with three folds in it (and in its deadfold wires). Thus two folds at the mouth end effectively create three folds or crease lines in the sticker 20 and its deadfold wires as well as in the flattened walls at the mouth end of the bag. A surprisingly strong and even "tight" reclosure is thus formed.

Those skilled in the art will readily recognize that this invention may be embodied in still other specific forms than illustrated without departing from the spirit or essential characteristics of it. The illustrated embodiments are therefore to be considered in all respects illustrative and not restrictive, the scope of the invention being indicated by the appended claims rather than the foregoing description; and all variations that come within the meaning and range of equivalency of the claims are therefore intended to be embraced thereby.

That which is claimed is:

1. An article of manufacture having a deadfold reclosure sticker for hand pressure application to a bag to provide deadfold reclosability for the bag, consisting of a flexible backing liner having a low adhesion surface and a flexible deadfold reclosure sticker having a pressure-sensitive adhesive layer forming a base surface releasably adhered to said low adhesion surfaces, said deadfold reclosure sticker consisting of a laminate of pliable layers having a total thickness less than 7 mils and at least two deadfold wires having a thickness at least twice as great as said laminate, said wires being in spaced parallel alignment and embedded along their length in said laminate with the ends of said wires exposed to view, said flexible backing liner having a structural feature for easy removal of it.

2. The article of claim 1 wherein said structural feature for easy removal of said liner comprises a weakness slit in said liner which, on bending to separate said liner at said slit into two parts, permits finger removal of each said part from the base surface of said sticker, said weakness slit being parallel with said wires and located between said wires of said sticker.

3. The article of claim 1 wherein said structural feature for easy removal of said liner comprises a portion of said backing liner projecting beyond an edge of said sticker.

4. The article of claim 1 wherein said deadfold sticker has a first dimension parallel to said deadfold wires and a second dimension transverse to said deadfold wires, said first dimension being greater than said second dimension of said stickers.

5. The article of claim 1 wherein said laminate of pliable layers comprises said pressure-sensitive adhesive layer, plus an outer layer structure having an exposed face, an inner layer structure situated between said outer layer structure and said liner, and a bonding layer permanently uniting said outer layer structure to said inner layer structure, said bonding layer being such as to permanently secure said deadfold wires in said embedded condition in said laminate.

6. An article of manufacture having: a hand-pressure-attachable deadfold reclosure sticker releasably adhered to a removable protective liner and consisting of a laminate of layers including a pressure-sensitive adhesive layer in contact with said removable liner, and at least two deadfold wires in spaced parallel alignment permanently embedded along their length in said laminate, the thickness of said wires being at least twice as great as the total thickness of all other layers making up said laminate, and said entire laminate being flexible and removable from said liner for hand-pressure affixation on the surface of a flexible bag to provide a mouth-foldable deadfold reclosure for the bag.

7. An article marketable in commerce having a discrete flexible deadfold reclosure sticker for flat hand-pressure application by individuals to a bag to provide deadfold reclosability for the bag, said article consisting of a flexible backing liner having a low adhesion surface and said discrete flexible deadfold reclosure sticker having a base surface releasably adhered to said low adhesion surface, said discrete flexible deadfold reclosure sticker consisting of a laminate of pliable layers having a total thickness less than 7 mils and at least two deadfold wires having a thickness at least about three times as great as said laminate, said wires being in spaced parallel alignment and embedded along their length in said laminate with the ends of said wires exposed to view, said laminate of pliable layers consisting of a pressure-sensitive adhesive layer forming said base surface, plus an outer layer structure about 0.5 to 5.0 mils thick having an exposed face containing a visible design protected by a clear film or coating, an inner layer structure about 0.5 to 3.0 mils thick situated between said outer layer structure and said pressure-sensitive adhesive layer, and an elastomeric non-tacky bonding layer about 0.5 to 2 mils thick permanently uniting said outer layer structure to said inner layer structure, said bonding layer being such as to permanently secure said deadfold wires in said embedded condition in said laminate, and said flexible backing liner having a structural feature for easy hand removal of it from said discrete flexible deadfold reclosure sticker.

8. As an article of commerce: a discrete flexible hand-pressure-attachable deadfold reclosure sticker releasably adhered to a removable protective liner and consisting of a laminate of pliable layers having a total thickness less than 7 mils and at least two deadfold wires in spaced parallel alignment permanently embedded along their length in said laminate, the thickness of said wires being at least twice as great as the total thickness of all other layers making up said laminate, said laminate of pliable layers consisting of a pressure-sensitive adhesive layer in contact with said removable protective liner, plus an outer layer structure about 0.5 to 5.0 mils thick having an exposed face, an inner layer structure about 0.5 to 3.0 mils thick adhered to said pressure-sensitive adhesive layer, and an elastomeric non-tacky bonding layer about 0.5 to 2 mils thick permanently uniting said outer layer structure to said inner layer structure and permanently securing said deadfold wires in said embedded condition in said laminate, and said entire laminate including said deadfold wires being flexible and removable from said liner for hand-pressure affixation on the surface of a flexible bag to provide a mouth-foldable deadfold reclosure for the bag.

* * * * *

UNITED STATES PATENT AND TRADEMARK OFFICE
CERTIFICATE OF CORRECTION

PATENT NO. :   5,215,797
DATED      :   June 1, 1993
INVENTOR(S) :  Brian D. Larsen and Lloyd Tinklenberg It is certified that error appears in the above-identified patent and that said Letters Patent is hereby corrected as shown below:

```
Claim 7, at column 7, line 1, "marketable in commerce"
     should read --of manufacture--.
Claim 8, at column 8, line 1, "As an article of commerce:"
     should read --An article of manufacture having--.
```

Signed and Sealed this

Twenty-first Day of December, 1993

Attest:

BRUCE LEHMAN

*Attesting Officer*   *Commissioner of Patents and Trademarks*